United States Patent
Steeby et al.

[11] Patent Number: 5,992,256
[45] Date of Patent: Nov. 30, 1999

[54] CONTROL TO SUSPEND AUTOMATIC UPPER RATIO SHIFTING

[75] Inventors: Jon A. Steeby, Schoolcraft; Douglas C. Gooch, Richland, both of Mich.

[73] Assignee: Eaton Corporation, Cleveland, Ohio

[21] Appl. No.: 09/200,555

[22] Filed: Nov. 27, 1998

[51] Int. Cl.⁶ .................................................. F16H 59/12
[52] U.S. Cl. ................................................ 74/335; 477/79
[58] Field of Search ....................... 477/79, 80, 81; 74/335

[56] References Cited

U.S. PATENT DOCUMENTS

| | | | |
|---|---|---|---|
| 4,361,060 | 11/1982 | Smyth et al. | 74/866 |
| 4,595,986 | 6/1986 | Daubenspeck et al. | 364/424.1 |
| 4,722,248 | 2/1988 | Braun | 74/866 |
| 4,850,236 | 7/1989 | Braun | 74/337 |
| 5,179,867 | 1/1993 | Sakakibara et al. | 74/335 |
| 5,315,900 | 5/1994 | Teeter | 477/165 |
| 5,390,561 | 2/1995 | Stine | 74/331 |
| 5,435,212 | 7/1995 | Menig | 74/745 |
| 5,481,077 | 1/1996 | Clegg et al. | 200/61.88 |
| 5,795,264 | 8/1998 | Steeby et al. | 477/124 |

FOREIGN PATENT DOCUMENTS 40-4362351  12/1992  Japan ............................. F16H 59/12

*Primary Examiner*—Khoi Q. Ta
*Attorney, Agent, or Firm*—Howard D. Gordon

[57] ABSTRACT

A partially automated mechanical transmission system (92) having a mechanical transmission (10) with a lower group (first-eighth) of manually shifted ratios and an upper group (ninth-tenth) of ratios with automatic shifting between ratios in the upper group and requiring manual shifting between groups. Control logic is provided to sense a driver intention to retain the transmission engaged in a current engaged upper group ratio until the occurrence of an event, such a manual shift into transmission neutral. In one embodiment, the on/off switch (184) from the cruise control control panel (125) is utilized to provide a signal indicative of operator intent to temporarily suspend automatic upper ratio shifting.

10 Claims, 6 Drawing Sheets

| GEAR RATIOS | | |
|---|---|---|
| SPEED | RATIO | % STEP |
| 10 | 0.75 | 33% |
| 9 | 1.00 | 33% |
| 8 | 1.33 | 33% |
| 7 | 1.78 | 33% |
| 6 | 2.37 | 33% |
| 5 | 3.16 | 33% |
| 4 | 4.22 | 33% |
| 3 | 5.63 | 33% |
| 2 | 7.51 | 33% |
| 1 | 10.01 | |
| R HI | 9.30 | |
| R LO | 12.38 | |

OVERALL RATIO 13:1

SHIFT PATTERN

| R LO | 3 | 7 |
|---|---|---|
| R HI | 4 | 8 |

| 1 | 5 | 9 |
|---|---|---|
| 2 | 6 | 10 |

LOW RANGE — HIGH RANGE

Fig.2 PRIOR ART

VALVE TABLE

| GEAR | S #1 | S #2 |
|---|---|---|
| 1 – 8 | OFF | OFF |
| 9 | ON | OFF |
| 10 | OFF/ON | ON |

CONTROL TO SUSPEND AUTOMATIC UPPER RATIO SHIFTING

RELATED APPLICATIONS

This application is related to U.S. Ser. No. 08/847,179 filed May 1, 1997, titled TRANSMISSION CONTROL LEVER WITH USER INTERFACE and assigned to EATON CORPORATION, the assignee of this application.

BACKGROUND OF THE INVENTION

1. Field of the Invention

The present invention relates to semi-automatic mechanical transmission systems having automatic shifting in the upper two or more ratios and manual shifting in some or all of the lower ratios and, in particular, to a control to allow an operator to request suspension of automatic upper ratio shifting until the occurrence of a predetermined event, such as movement of the shift lever, depression of the clutch pedal or the like.

2. Description of the Prior Art

Partially automated vehicular transmission systems requiring manual shifting in some or all of the lower ratios and having a control for automated shifting in the upper ratios are known in the prior art, as may be seen by reference to U.S. Pat. Nos. 4,722,248; 4,850,236; 5,038,627; 5,393,276; 5,393,277; 5,498,195 and 5,795,264, the disclosures of which are incorporated herein by reference.

Splitter and combined range and splitter-type compound vehicular transmissions requiring manual splitter shifting are well known in the prior art, as may be seen by reference to U.S. Pat. Nos. 3,799,002; 4,754,665; 4,974,468; 5,000,060; 5,370,013 and 5,390,561, the disclosures of which are incorporated herein by reference.

Such transmissions are commercially sold by Eaton Corporation under the trademark "Top-2" and by Dana Corporation under the trademark "Automate II."

It is desirable to improve these prior art systems by providing a control which will allow the vehicle operator to request that automatic upper ratio shifting be suspended, and the transmission be retained in the currently engaged upper ratio, until the occurrence of a predetermined event. Preferably, this control feature will be provided without the necessity of additional control members.

SUMMARY OF THE INVENTION

In accordance with the present invention, an improved partially automated transmission system having automated shifting in the upper ratios and requiring manual shifting into the automated upper ratios is provided with a relatively simple and inexpensive control allowing the vehicle operator to temporarily suspend automatic upper ratio shifting and retain the transmission in the currently engaged upper ratio.

The foregoing is accomplished by providing a switch or, preferably, using an existing switch (such as the on/off switch from the vehicle "cruise control" controls) by which the operator can signal a request to suspend automatic upper ratio shifting and to retain the transmission in the currently engaged ratio. The system controller will respond to such signal, if the transmission is engaged in one of the automated upper ratios, by retaining such ratio engaged until the occurrence of a predetermined event (such as sensing a manual shift into neutral), a manual disengagement of the vehicle master clutch and/or receipt of a countervailing signal. Upon sensing the occurrence of such event, the standard or default mode of operation, automatic shifting in the upper ratios, will resume.

Accordingly, it is an object of the present invention to provide a new and improved partially automated transmission having automatic shifting in the upper ratios and an operator input device for requesting temporary suspension of such automatic shifting.

This and other objects and advantages of the present invention will become apparent from a reading of the following description of the preferred embodiment taken in connection with the attached drawings.

BRIEF DESCRIPTION OF THE DRAWINGS

FIG. 2 is a schematic illustration of the manual shift pattern and ratio steps for the transmission of FIGS. 1 and 1A.

FIG. 4 is a valve table for the control valve assembly utilized in the system of FIG. 3.

DESCRIPTION OF THE PREFERRED EMBODIMENT

Figure 1:
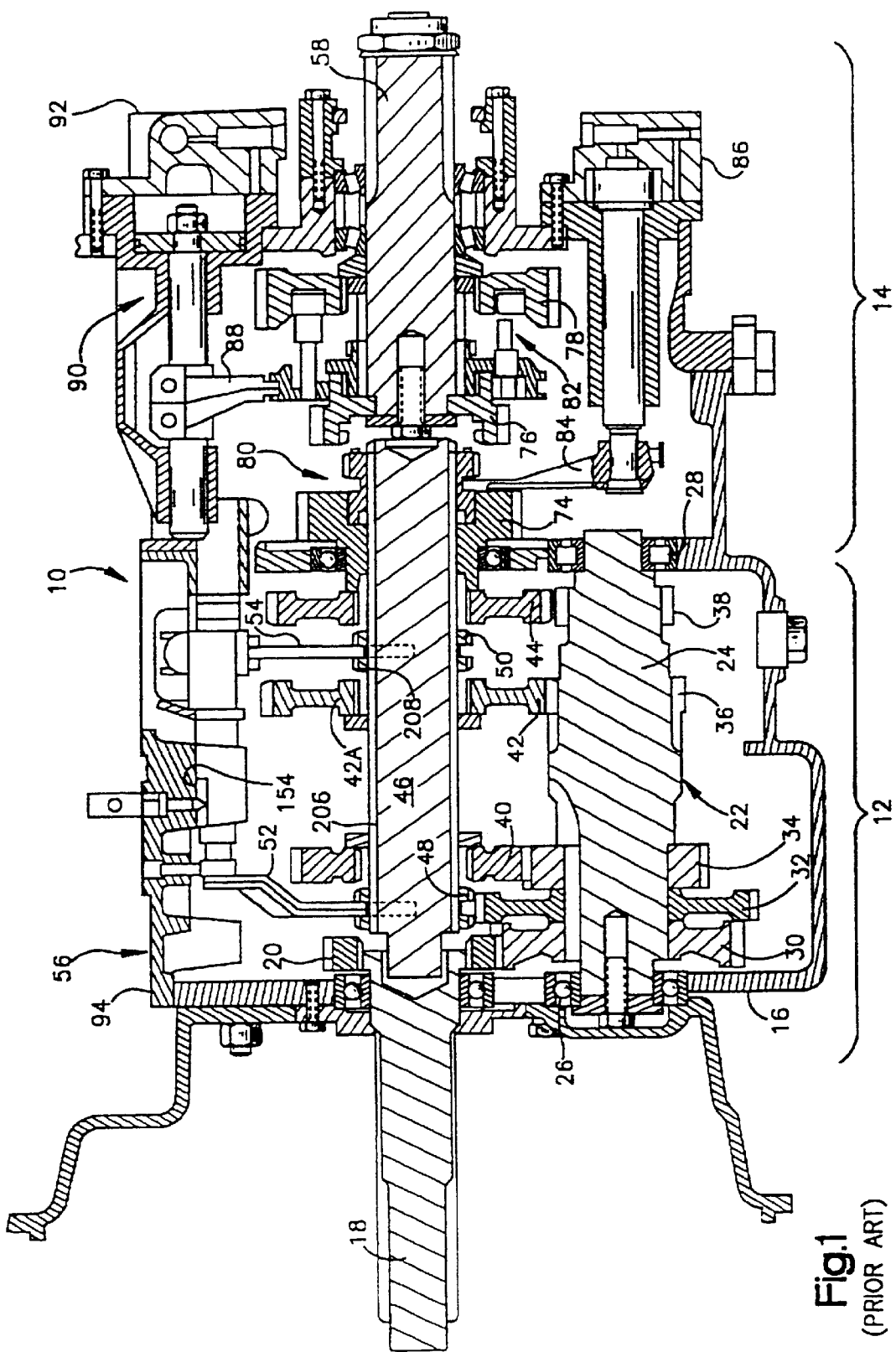
FIGS. 1 and 1A are sectional views of a typical prior art splitter or combined splitter and range-type compound transmission.
Figure 1A:
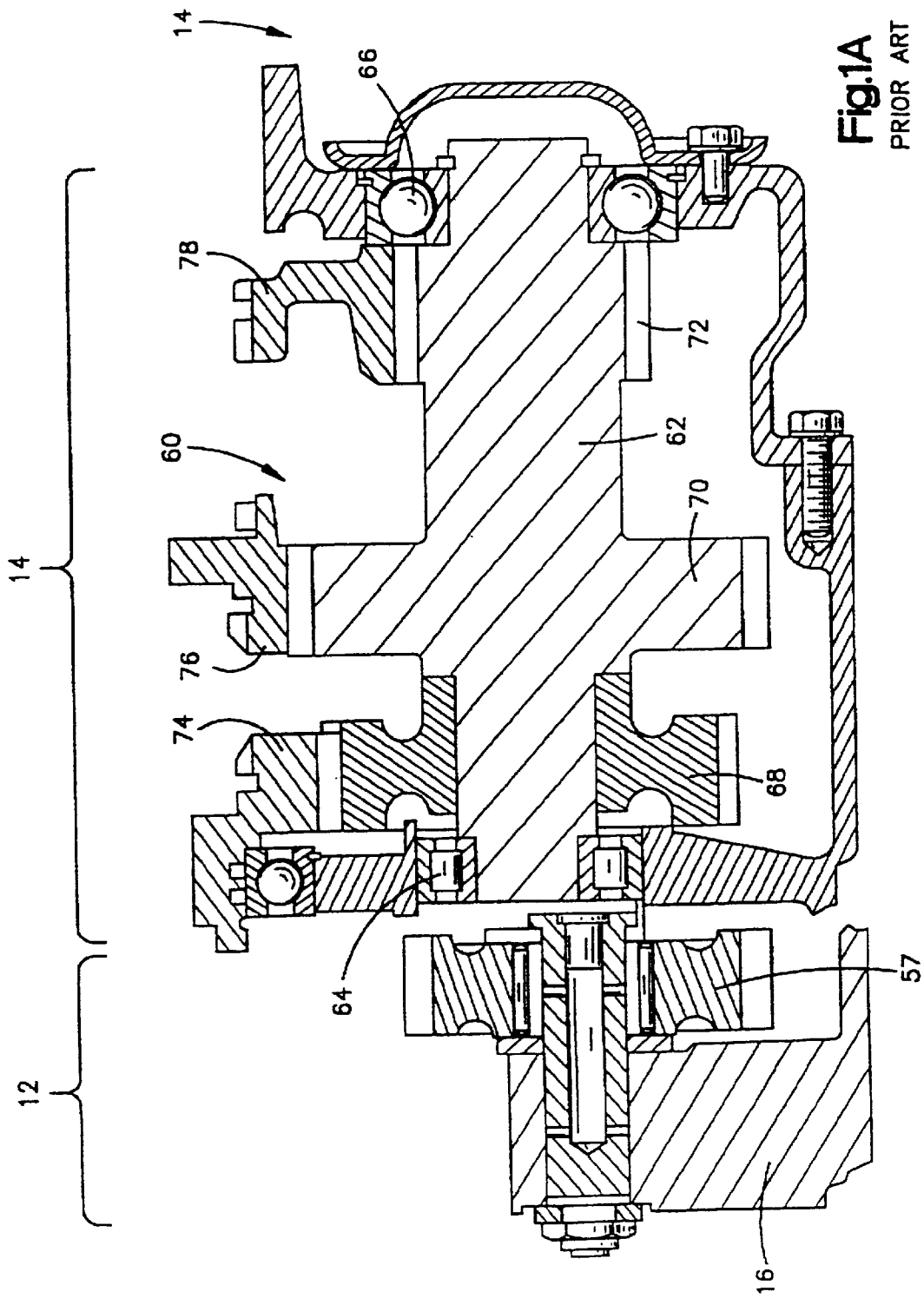

FIGS. 1, 1A and 2 illustrate a typical combined splitter and range type compound mechanical transmission 10 of the type advantageously utilized in connection with the control of the present invention.

Transmission 10 comprises a main transmission section 12 connected in series with an auxiliary transmission section 14 having both range and splitter-type gearing. Typically, transmission 10 is housed within a single multi-piece housing 16 and includes an input shaft 18 driven by a prime mover (such as a diesel engine) through a selectively disengaged, normally engaged friction master clutch.

In the main transmission section 12, the input shaft 18 carries an input gear 20 for driving at least one countershaft assembly 22. Preferably, as is well known in the prior art and as is illustrated in U.S. Pat. Nos. 3,105,395 and 3,335,616, the disclosures of which are hereby incorporated by reference, input gear 20 simultaneously drives a plurality of substantially identical main section countershaft assemblies at substantially identical rotational speeds. Each of the main section countershaft assemblies comprises a main section countershaft 24 supported by bearings 26 and 28 in housing 16 and is provided with main section countershaft gears 30, 32, 34, 36 and 38 fixed thereto. A plurality of main section drive or main shaft gears 40, 42 and 44 surround the transmission main shaft 46 and are selectively clutchable, one at a time, to the main shaft 46 for rotation therewith by sliding clutch collars 48 and 50, as is well known in the art.

Clutch collar 48 may also be utilized to clutch input gear 20 to the main shaft 46 to provide a direct drive relationship between the input shaft 18 and the main shaft 46. Preferably, each of the main section main shaft gears encircles the main shaft 46 and is in continuous meshing engagement with and is floatingly supported by the associated countershaft gear groups, which mounting means and special advantages resulting therefrom are explained in greater detail in aforementioned U.S. Pat. Nos. 3,105,395 and 3,335,616. Typically, clutch collars 48 and 50 are axially positioned by means of shift forks or yokes 52 and 54, respectively, associated with a shift bar housing assembly 56 of the type illustrated in U.S. Pat. Nos. 4,920,815 and 5,000,060. Clutch collars 48 and 50 are, in the preferred embodiment, of the well-known, non-synchronized, double-acting jaw clutch type.

Main section main shaft gear 44 is the reverse gear and is in continuous meshing engagement with countershaft gears 38 by means of conventional intermediate idler gears 57 (see FIG. 1A). Main section countershaft gear 32 is provided for powering power takeoff devices and the like. Jaw clutches 48 and 50 are 3-position clutches in that they may be positioned in a centered axially non-displaced, non-engaged position as illustrated or in a fully rightwardly engaged or fully leftwardly engaged position.

Auxiliary transmission section 14 is connected in series with main transmission section 12 and is of the 3-layer, 4-speed combined splitter/range type, as illustrated in above-mentioned U.S. Pat. No. 4,754,665. Main shaft 46 extends into the auxiliary section 14 and is journaled in the inward end of the output shaft 58 which extends from the rearward end of the transmission.

Auxiliary transmission section 14 includes, in the preferred embodiment thereof, a plurality of substantially identical auxiliary countershaft assemblies 60 (see FIG. 1A), each comprising an auxiliary countershaft 62 supported by bearings 64 and 66 in housing 16 and carrying three auxiliary section countershaft gears 68, 70 and 72 fixed for rotation therewith. Auxiliary countershaft gears 68 are constantly meshed with and support auxiliary section splitter gear 74. Auxiliary countershaft gears 70 are constantly meshed with and support auxiliary section splitter/range gear 76 which surrounds the output shaft 58 at the end thereof adjacent the coaxial inner end of main shaft 46. Auxiliary section countershaft gears 72 constantly mesh with and support auxiliary section range gear 78, which surrounds the output shaft 58. Accordingly, auxiliary section countershaft gears 68 and splitter gear 74 define a first gear layer, auxiliary section countershaft gears 70 and splitter/range gear 76 define a second gear layer and auxiliary section countershaft gears 72 and range gear 78 define a third layer, or gear group, of the combined splitter and range-type auxiliary transmission section 14.

A sliding 2-position jaw clutch collar 80 is utilized to selectively couple either the splitter gear 74 or the splitter/range gear 76 to the main shaft 46, while a 2-position synchronized clutch assembly 82 is utilized to selectively couple the splitter/range gear 76 or the range gear 78 to the output shaft 58.

The splitter jaw clutch 80 is a 2-position clutch assembly which may be selectively positioned in the rightwardmost or leftwardmost positions for engaging either gear 76 or gear 74, respectively, to the main shaft 46. Splitter jaw clutch 80 is axially positioned by means of a shift fork 84 controlled by a 2-position piston actuator 86, which normally is operable by a driver selection switch such as a button or the like on the shift knob, as is known in the prior art. Alternatively, the splitter clutch 80 may be positioned by a 3-position actuator having a maintainable neutral or centered position. Two-position synchronized range clutch assembly 82 is also a 2-position clutch which may be selectively positioned in either the rightwardmost or leftwardmost positions thereof for selectively clutching either gear 78 or 76, respectively, to output shaft 58. Clutch assembly 82 is positioned by means of a shift fork 88 operated by means of a 2-position piston device 90, the actuation and control of which is described in greater detail in aforementioned U.S. Pat. No. 4,974,468.

As may be seen by reference to FIGS. 1–2, by selectively axially positioning both the splitter clutch 80 and the range clutch 82 in the forward and rearward axial positions thereof, four distinct ratios of main shaft rotation to output shaft rotation may be provided. Accordingly, auxiliary transmission section 14 is a 3-layer auxiliary section of the combined range and splitter type providing four selectable speeds or drive ratios between the input (main shaft 46) and output (output shaft 58) thereof. The main section 12 provides a reverse and three potentially selectable forward speeds. However, one of the selectable main section forward gear ratios, the low speed gear ratios associated with main shaft gear 42, is not utilized in the high range. Thus, transmission 10 is properly designated as a "(2+1)×(2×2)" type transmission providing nine or ten selectable forward speeds, depending upon the desirability and practicality of splitting the low gear ratio.

While clutch 82 (the range clutch) should be a synchronized clutch, double-acting clutch collar 80 (the splitter clutch) is not required to be synchronized. The shift pattern for manually shifting transmission 10 is schematically illustrated in FIG. 2. Divisions in the vertical direction at each gear lever position signify splitter shifts, while movement in the horizontal direction from the ¾ and ⅝ leg of the H pattern to the ⅞ and 9/10 leg of the H pattern signifies a shift from the low range to the high range of the transmission. As discussed above, manual splitter shifting is accomplished in the usual manner by means of a vehicle operator-actuated splitter button or the like, usually a button located at the shift lever knob, while operation of the range clutch shifting assembly is an automatic response to movement of the gear shift lever between the central and rightwardmost legs of the shift pattern, as illustrated in FIG. 2. Range shift devices of this general type are known in the prior art and may be seen by reference to U.S. Pat. Nos. 3,429,202; 4,455,883; 4,561, 325 and 4,663,725, the disclosures of which are incorporated herein by reference. Manually operated splitter and range shift actuators are known in the prior art and may be seen by reference to U.S. Pat. Nos. 5,193,410; 5,199,314 and 5,329,826, the disclosures of which are incorporated herein by reference.

Figure 3:
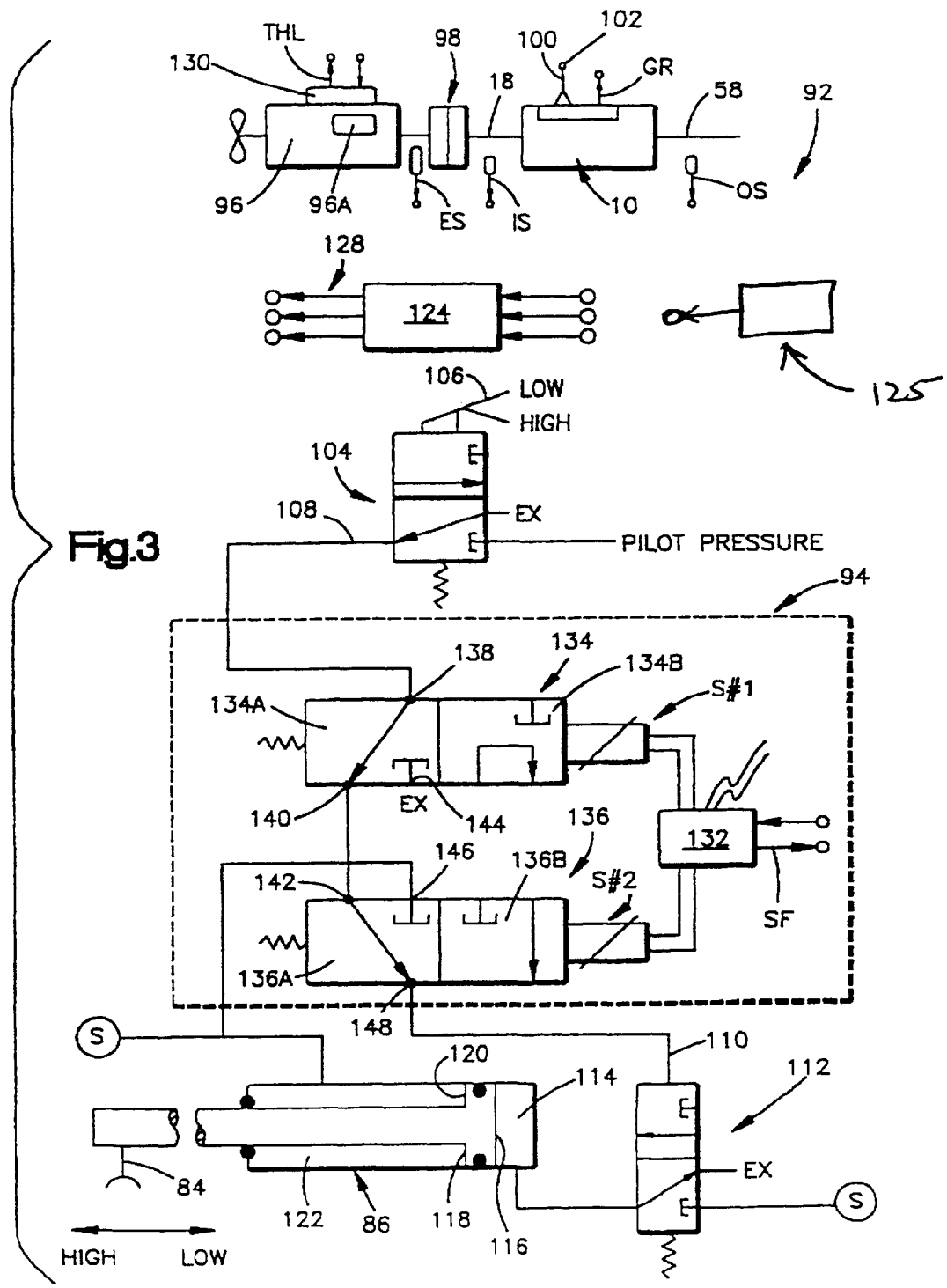
FIG. 3 is a schematic illustration of a partially automated vehicular mechanical transmission system having both manual and automatic splitter shifting and utilizing the control of the present invention.
Figure 5:
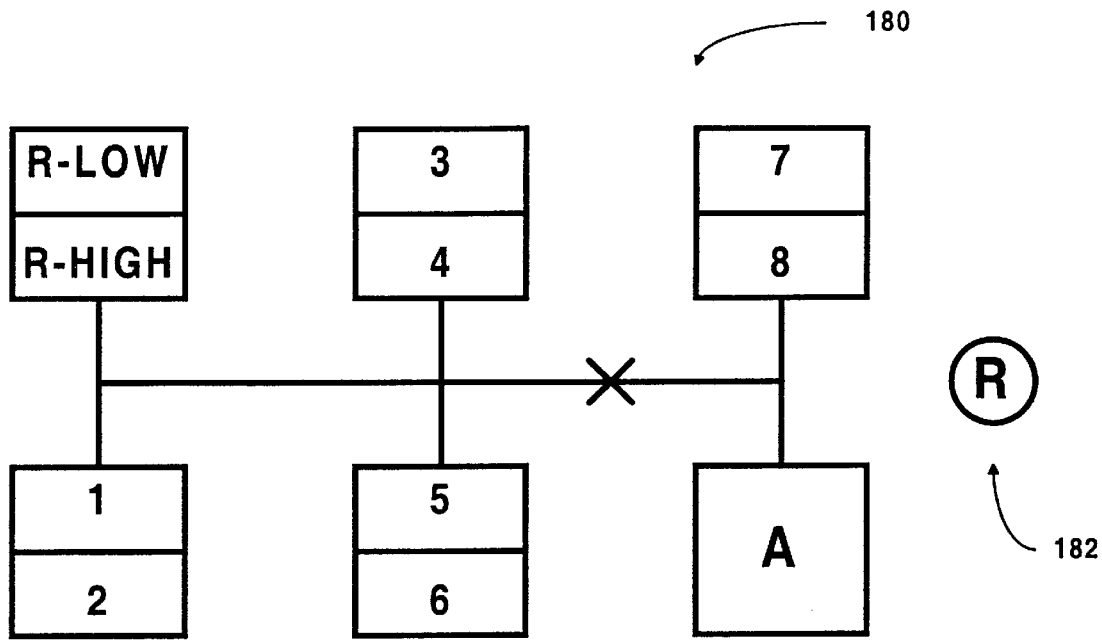
FIG. 5 is a schematic illustration, similar to FIG. 2, of the shift pattern and ratio steps for the transmission system of FIG. 3.
Figure 6:
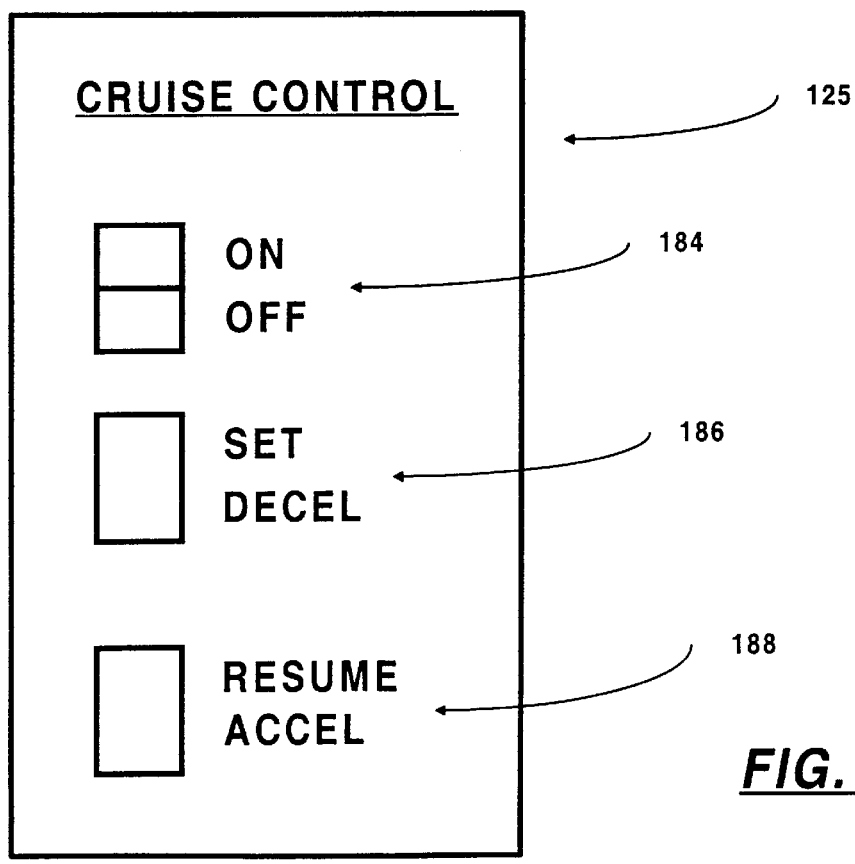
FIG. 6 is a schematic illustration of a typical vehicular cruise control control panel.

A partially automated vehicular mechanical transmission system 92 utilizing the control system of the present invention is illustrated in FIG. 3. Partially automated system 92 is of the type requiring manual shifting in the lower gear ratios (first through eighth) and, after initial manual selection of one of the upper two ratios, providing automatic shifting in the upper gear ratios (ninth and tenth), as described in aforementioned U.S. Pat. No. 4,722,248; 4,850,236; 5,038, 027 and 5,393,276. The shift pattern for partially automated operation of the system 92 is schematically illustrated in FIG. 5.

The system includes a splitter control valve assembly 94 and a prime mover (such as diesel engine 96) driving the input shaft 18 of transmission 10 through a master friction clutch 98. The transmission 10 includes a shift lever 100 having a shift knob 102, which is associated with the shift bar housing 56 for manually shifting main section 12 and the range clutch 82 of auxiliary section 14.

A manually operated splitter valve 104, having a selector lever or button 106, is provided, usually on or integral with the shift knob, for manually shifting the splitter clutch 80. Splitter valve 104 is a 2-position, 3-way manually operated valve effective to selectively connect a first pilot conduit 108 to exhaust ("Ex") or to pilot pressure, respectively, to manually select either the high or low splitter ratio. The pilot pressure may be equal to supply pressure ("S") or to a lower value. In a typical onboard pneumatic system, supply is filtered, regulated air at about 60 to 80 psi.

The first pilot conduit 108 may fluidly communicate with a second pilot conduit 110 in series through the control valve assembly 94 of the present invention. The second pilot conduit 110 is effective to act on a 2-position, 3-way pilot valve 112, which is effective to normally vent or selectively pressurize a control chamber 114 of the splitter piston/cylinder actuator assembly 86. Chamber 114 is exposed to the larger area face 116 of a differential area piston 118 having a smaller area face 120 constantly exposed to supply pressure in biasing chamber 122. As is known, a spring may be utilized in place of or in combination with smaller area piston face 120 to bias piston 118 rightwardly, as seen in FIG. 3.

As may be seen, when pilot conduit 110 is exhausted, pilot valve 112 will connect control chamber 114 to exhaust, and supply pressure acting on smaller area face 120 will cause shift fork 84 to move splitter clutch 80 to engage gear 76 for the low splitter ratio, and when pilot conduit 110 is pressurized, valve 112 will move against a bias to a position for pressurizing control chamber 114, causing the piston 118 to move leftwardly to cause splitter clutch 80 to engage gear 74 for the high splitter ratio.

Except for interposing the control valve assembly 94 in series between pilot conduits 108 and 110, the above-described components are structurally and functionally equivalent to components utilized to shift the manually shifted transmission of FIGS. 1, 1A and 2.

To provide the partially automated operation of system 92, a controller 124, preferably a microprocessor-based controller, is provided for receiving input signals 126 and for processing same according to predetermined logic rules to issue command output signals 128 to various system actuators, such as an engine fuel control 130 and a solenoid driver and fault detection unit 132. Controllers of this type may be seen by reference to U.S. Pat. Nos. 4,361,060 and 4,595,986, the disclosures of which are incorporated herein by reference. The program for controller 124 is stored on a computer-usable medium such as a floppy disk, hard drive, CD-rom, tape or other external or internal storage medium.

Sensors for sensing engine speed (ES) and/or input shaft speed (IS) and output shaft speed (OS) may be provided, as well as sensors for sensing engine fueling THL and solenoid faults SF, all of which provide input signals indicative thereof to the controller 124. With the clutch 98 engaged, input shaft speed may be assumed to equal engine speed.

As is known, the engine 96 may have a built-in controller 96A and/or may communicate with controller 124 by an electronic data link of the type conforming to SAE J-1922, SAE J-1939, ISO 11898 or the like. All or a portion of controller 124 may be defined by hardware and/or software associated with engine controller 96A. A sensor may be provided for providing a signal (GR) indicative of engaged gear ratio or gear ratio may be calculated and confirmed by dividing input shaft speed or engine speed by output shaft speed (GR=(IS or ES/OS)±error?). The data link will typically include information as to throttle position (THL), or a separate throttle position sensor may be provided.

Preferably, the system also will include a "cruise control" control 125 by which the operator can provide his/her input for the well-known cruise control function.

The control valve assembly 94 of the present invention is interposed in series between the standard manual splitter shift selection valve 104 and the standard pilot valve 112/splitter actuator 86 and is operated in response to command output signals from controller 124. The assembly includes, in series, a first 2-position, 3-way solenoid-controlled valve 134 and a second 2-position, 3-way solenoid-controlled valve 136 and a solenoid driver and fault detection unit 132 operating in response to command output signals from the controller.

Valve 134 has an inlet 138 connected to pilot conduit 108 and two outlets 140 (connected to one inlet 142 of valve 136) and 144 (connected to exhaust). Valve 134 has a first normal or default position wherein inlet 138 is connected to outlet 140, and thus, to inlet 142 of valve 136, while outlet 144 of valve 134 is blocked. Valve 134 has a second or actuated position upon energizing the first solenoid S#1 wherein outlet 140 is connected to exhaust at outlet 144 and inlet 138 is blocked.

Valve 136 has two inlets 142 (connected to the outlet 140 of valve 134) and 146 (connected to the source of pressurized fluid) and an outlet 148 connected to the second pilot conduit 110 controlling the pilot valve 112. Valve 136 has a first normal or default position wherein inlet 142 is connected to outlet 148 and the inlet 146 from source pressure is blocked, and a second actuated position upon energizing the second solenoid S#2 wherein inlet 142 is blocked and source pressure at inlet 146 communicates with outlet 148 and pilot conduit 110.

The valve table for operation of the solenoid-operated valves is set forth in FIG. 4.

The controller 124 senses a manual splitter operation mode by sensing a shift bar condition GR other than AUTO (see FIG. 5). In this mode (i.e., gear ratios 1–8), the solenoid driver is commanded to de-energize both of the solenoids, and the valves 134 and 136 will assume the default positions thereof. Pilot conduit 108 will communicate with pilot conduit 110 through the valves 134 and 136, and the actuator 86 will be under the manual control of selector valve 104.

AUTO or not-AUTO mode conditions may be sensed by position sensors or, preferably, by processing the ES and OS signals according to predetermined logic rules.

Upon sensing a manual shift to the AUTO position, the controller will cause the solenoid driver 132 to energize the first solenoid S#1 to create an automatic-only splitter situation, as valve 134 moves to its second position, wherein the pilot conduit 108 controlled by manual selector valve 104 is blocked at inlet 138, and thus, the series connection through port 140 to the pilot valve 112 is blocked. With valve 134 in the second or actuated position thereof, the manual selector 104 is ineffective to control pilot valve 112 or splitter actuator 86.

In the current example, ninth and tenth speeds are the AUTO mode gear ratios, while eighth speed is the "entry gear ratio." A shift or intent to shift into the AUTO mode is confirmed when either:

(1) gear ratio is the entry gear ratio, and
(2) vehicle speed exceeds a first reference value (REF$_1$), followed by (3) a shift into neutral;
OR
(1) vehicle speed exceeds the first reference value, and
(2) gear ratio is one of the AUTO mode ratios.

The first reference value ($REF_1$) is an output shaft speed at which a manual upshift from the entry gear is expected to occur, usually about the minimum output shaft speed at which an upshift from the entry gear is expected to occur.

When in the AUTO mode of operation, manual control 104 is bypassed and, based upon vehicle speed as indicated by the output shaft speed OS and/or the other sensed parameters, the control 124 will automatically determine if an automatic upshift from ninth to tenth or an automatic downshift from tenth to ninth is required, and will control engine fueling and the second solenoid-controlled valve 136 to implement same. With valve 134 actuated and valve 136 in its normal or default position, pilot conduit 110 is exhausted at port 144 of valve 134, and pilot valve 112 will exhaust the control chamber 114 of the piston/cylinder assembly 86, causing the piston to urge the splitter clutch in the low splitter ratio direction. With the second solenoid-controlled valve 136 actuated, pilot conduit 110 is connected to source pressure through inlet 146 and outlet 148 of valve 136, regardless of the position of valve 134, and pilot valve 112 will cause control chamber 114 to be pressurized, causing the piston 118 to urge the splitter clutch in the high splitter ratio direction. Valve 134 may be deactivated whenever valve 136 is energized to reduce heat generation.

In addition to causing the splitter clutch to be properly positioned in the AUTO mode, controller 124 will also cause the engine to be properly fueled to disengage the existing splitter ratio and synchronized for engaging the target splitter ratio. Upon sensing an eighth-to-ninth upshift into AUTO mode, the engine will be caused to synchronize for the required main and splitter clutch engagement.

Logic is provided allowing the system to sense if a lever shift from the entry ratio (eighth) is intended to be a downshift to a lower ratio or an upshift into one of the AUTO mode ratios (ninth or tenth). If a possible downshift from the entry ratio is sensed, the driver retains manual control of engine fueling and manual control of splitter shifting (solenoids S1 and S2 are turned off). If an upshift into AUTO mode is sensed, the system initiates automatic engine synchronizing for engaging the appropriate ratio. This logic may be appreciated in greater detail by reference to U.S. Pat. No. 5,795,264.

In systems having automatic shifting in the upper group of ratios, it may be desirable to allow the operator to temporarily suspend automatic shifting and retain the vehicle transmission engaged in the currently engaged upper ratio (9th or 10th). To accomplish this, the system controller 124 is provided with logic rules whereby, upon receipt of a signal indicative of an operator desire to suspend automatic shifting in the upper ratios, the system will command that the transmission remain engaged in the currently engaged upper ratio until the occurrence of a predetermined event. The predetermined event, by way of example, may include a lever shift into neutral, a disengagement of the master clutch 98 and/or a countervailing signal.

The shift pattern 180 for system 92 is illustrated in FIG. 5. An additional button 182, preferably a lighted button, may be provided for allowing the operator to provide and cancel a retain ("R") signal.

In a preferred embodiment, the vehicle will be provided with a well-known "cruise control" system including a control panel 125 having an on/off rocker switch 184, a "set/decel" button 186, and a "resume/accel" button 188. If the rocker switch 184 is moved from its "on" to its "off" position while the transmission is in the automatic shifting upper group of ratios ("A"), this may be considered the operator's signal for temporary suspension of upper ratio automatic shifting. This allows the suspension or retention mode to be selected without requiring the provision of an additional switch/button 182. If cruise control operation is not desired, the operator can simply put the switch 184 in the "on" position but not use button 186 to set a cruise speed.

Figure 7:
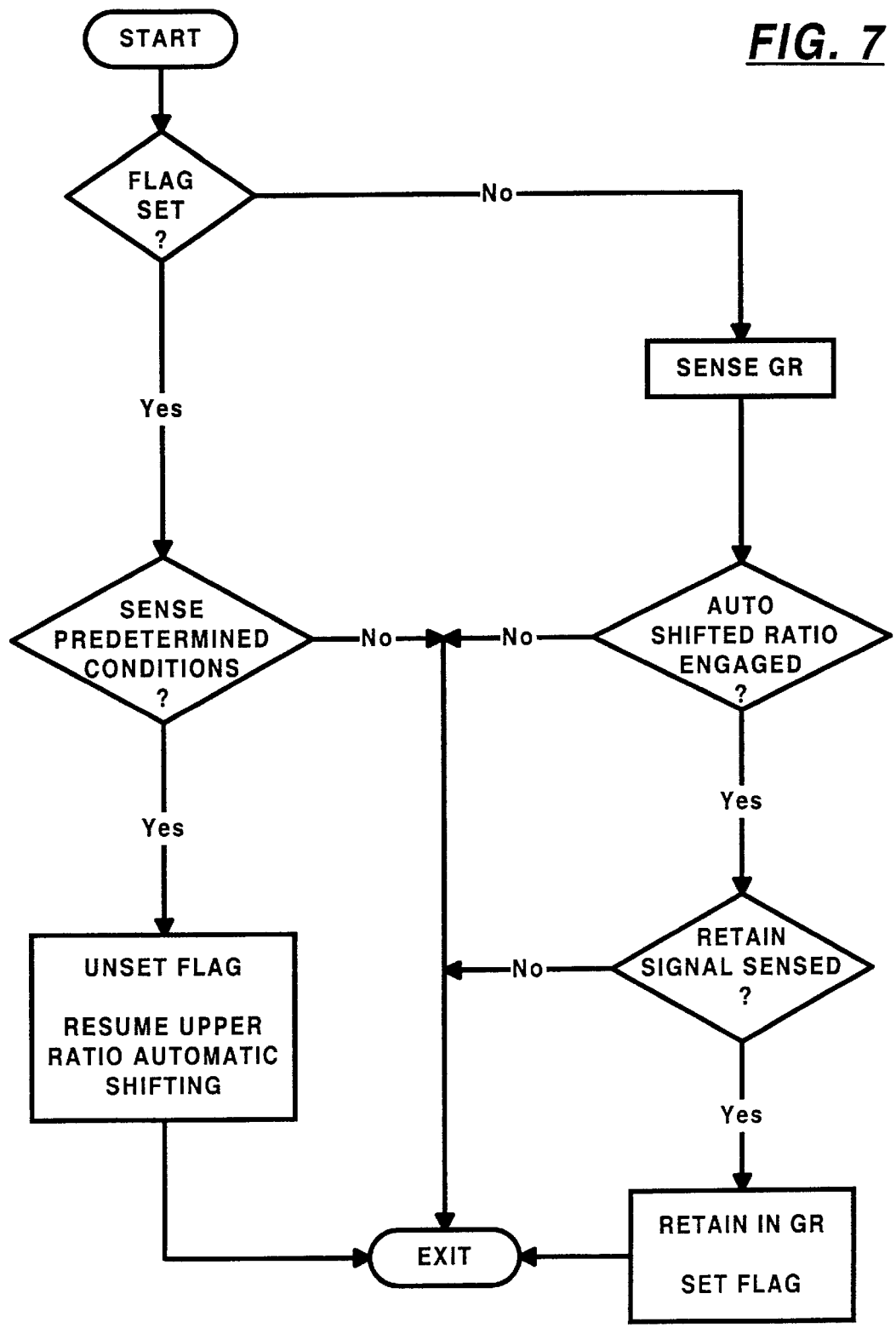
FIG. 7 is a schematic illustration, in flow chart format, of the control logic of the present invention.

FIG. 7 is a schematic illustration, in flow chart format, of the control of the present invention.

Accordingly, it may be seen that a relatively simple and inexpensive control for a partially automated transmission having automatic shifting in its upper group of ratios is provided, which allows the operator to request temporary suspension of such automated upper ratio shifting.

Although the present invention has been described with a certain degree of particularity, it is understood that the description of the preferred embodiment os by way of example only and that numerous changes to form and detail are possible without departing from the spirit and scope of the invention as hereinafter claimed.

We claim:

1. A vehicular, partially automated mechanical transmission system including a mechanical transmission having a lower group of ratios requiring manual shifting and an upper group of automated ratios, shifting between the ratios within said automated group of ratios being automated, shifting from a ratio in said lower group of ratios to a ratio in said upper group of automated ratios requiring a manually initiated shifting operation, said system including a controller for receiving input signals, including signals indicative of one or more of engine speed, transmission input shaft speed, transmission output shaft speed and/or operator-set throttle position, and for processing same in accordance with predetermined logic rules to issue command output signals to system controllers including an engine fueling controller and a transmission shift controller, said system characterized by:

means for providing a retaining signal indicative of an operator intent to retain said transmission engaged in a currently engaged ratio of said upper group of automated ratios; and said controller processing said logic rules including rules effective, upon (i) sensing said transmission is engaged in one of said ratios in said upper group of automated ratios, and (ii) receiving said retaining signal, to retain said transmission engaged in said currently engaged raito until the occurrence of a predetermined event.

2. The system of claim 1 wherein said predetermined event comprises sensing a manual shift to transmission neutral.

3. The system of claim 1 wherein said system includes a fuel-controlled engine drivingly connected to said transmission by a selectively engaged and disengaged master friction clutch, said predetermined event comprising sensing manual disengagement of said master friction clutch.

4. The system of claim 1 wherein said means is a manually operated switch.

5. The system of claim 4 wherein said predetermined event comprises a second actuation of said switch.

6. The system of claim 1 wherein said system includes an on/off switch for a vehicle cruise control system, said retaining signal comprising changing said on/off switch from an "on" position to an "off" position.

7. The system of claim 1 wherein said predetermined event is operator-initiated and is independent of throttle position, vehicle speed and engine speed.

8. The system of claim 1, 2, 3 or 4 wherein said transmission is a splitter-type transmission and said upper group of automated ratios comprises only the top two ratios.

9. The system of claim 1, 2, 3, 4 or 6 wherein said system includes an engine including an electronic engine controller, said controller defined by said engine controller.

10. The system of claim 6 wherein said predetermined event comprises changing said on/off switch from the "off" to the "on" position.

* * * * *